Sept. 29, 1931.   J. W. MARTIN, JR   1,825,644
REFRIGERATIVE DISH OR UTENSIL
Original Filed Nov. 4, 1926   2 Sheets-Sheet 1

INVENTOR
James W. Martin Jr
BY
his ATTORNEY

Sept. 29, 1931.　　　　J. W. MARTIN, JR　　　　1,825,644
REFRIGERATIVE DISH OR UTENSIL
Original Filed Nov. 4, 1926　　2 Sheets-Sheet 2

INVENTOR
James W. Martin Jr
BY
George Allan
his ATTORNEY

Patented Sept. 29, 1931

1,825,644

UNITED STATES PATENT OFFICE

JAMES W. MARTIN, JR., OF YONKERS, NEW YORK, ASSIGNOR, BY MESNE ASSIGNMENTS, TO DRYICE EQUIPMENT CORPORATION, OF NEW YORK, N. Y., A CORPORATION OF DELAWARE

REFRIGERATIVE DISH OR UTENSIL

Application filed November 4, 1926, Serial No. 146,181. Renewed December 9, 1929.

My present invention relates to dishes for display or table use in connection with perishable refrigerated products, as for instance, oysters-on-the-half-shell and cocktail sauce therefor; also more particularly for frozen products such as ice cream and similar confections. The use in connection with a container for cocktail sauce is analogous to and with slight changes of design applicable for display or service of bottles of cold drink such as ginger ale or the like.

One object of the invention is to provide a utensil wherein the cold product, such as oysters-on-the-half-shell or ice cream may be submerged in a body of cold, non-conducting, harmless gas, preferably carbon dioxide, while being fully exposed to view and preferably also while being eaten.

Another object is to secure the decorative effect obtainable while maintaining the surface of the dish in frosted condition.

Utensils adapted for the above purposes may be employed not only for keeping the products cold, but also for primary refrigeration thereof.

Figure 1:
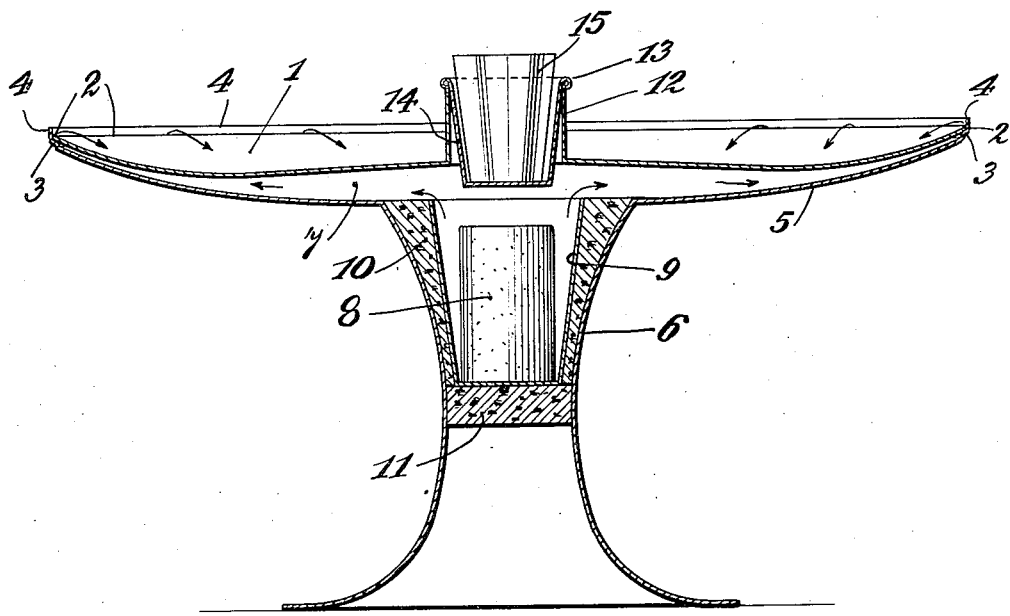
Figure 2:
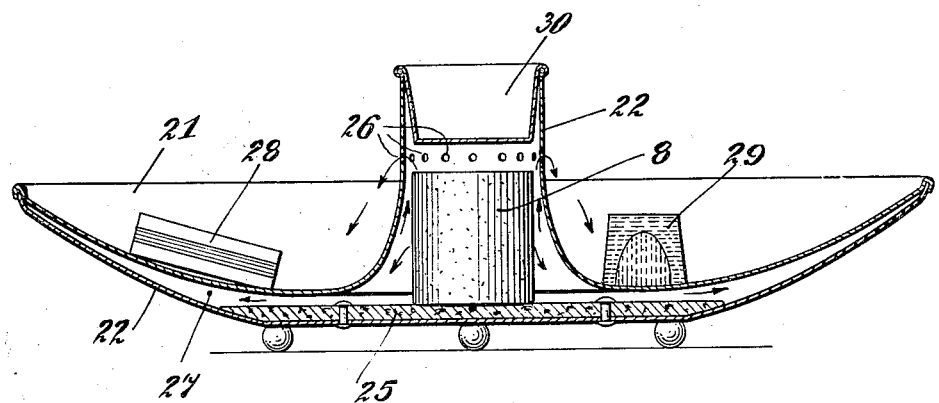
Figure 3:
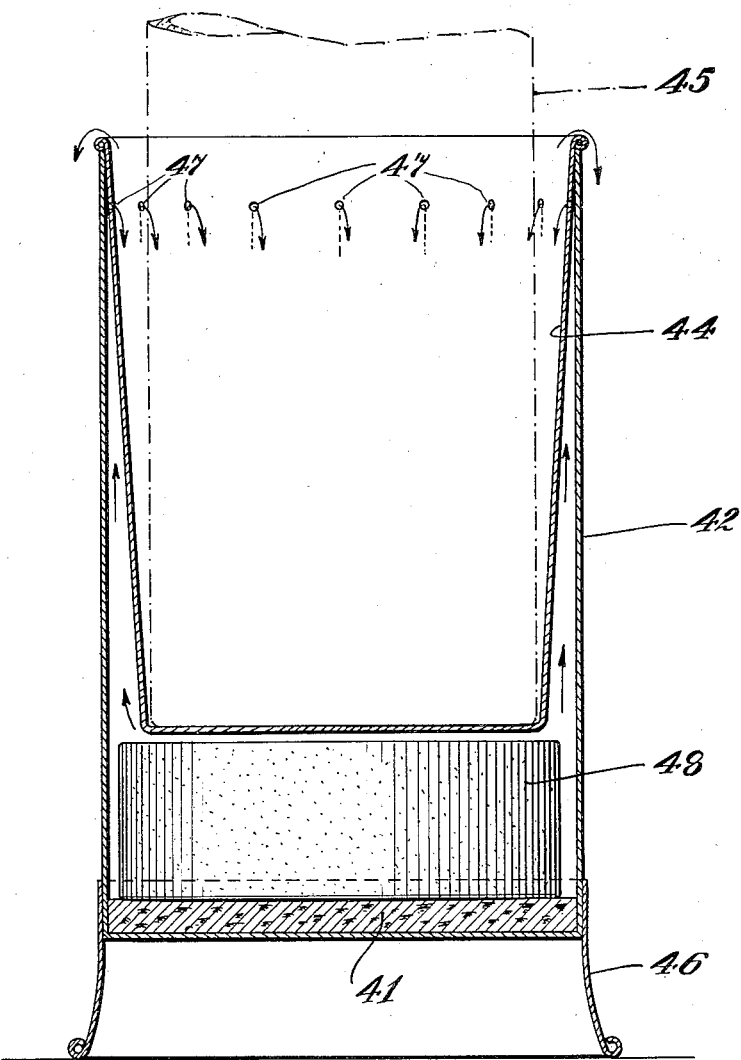

The above and other features of my invention will be more evident from the following description in connection with the accompanying drawings, in which Figs. 1, 2 and 3 are vertical sectional views of dishes for different purposes, differently embodying the main principles of my present invention.

In Fig. 1 there is a shallow metal dish, 1, suitable for service of oysters-on-the-half-shell or the like. This dish is removably supported by its edges 2, resting on ledges 3, within an upturned rim 4 of a dish or tray 5, supported by standard 6. Dish 5 is of deeper curvature than 6, for the purpose of leaving an interspace 7, to be filled with intensely cold carbon dioxide evaporating from a block of carbon dioxide 8, in an open top container 9, surrounded by cork or other suitable insulation, 10, and preferably supported at the bottom by a block 11 of cork or the like.

The display or serving plate, 1, may be formed with an upstanding cylinder, 12, supporting the bead, 13, of a metal cup, 14, which may be filled with a cocktail sauce or may serve as a container for a glass, 15, containing said sauce. Obviously, however, the cup, 14, either with or without the glass, 15, may be used for other purposes, as for instance, to contain ice water, flowers or other useful or decorative objects.

The block of solid carbon dioxide, 8, evaporates at a temperature of approximately 110° F. below zero, passing directly from solid to gas without any intermediate liquid state. This gas is approximately twice as heavy as air and is a very effective refrigerant medium. On evaporation, it flows out of the container, 9, and fills the interspace between the oyster plate, 1, and the support tray, 5, displacing the air. When the air has all been displaced, the carbon dioxide flows out around the edges of the oyster plate, 1, and down into the plate, as indicated by the arrows. This is facilitated by the fact that the gas is approximately twice as heavy as air and its downflow into the plate is therefore very marked. Eventually, the warmer upper portions of this layer of gas overflow the retaining rim, 4, and escape, but the continually renewed gas maintains the oysters partially or wholly submerged in the cold gas, thereby maintaining the oysters at the desired temperature for the same. Aside from the refrigerating effect, the submerging gas is a remarkable non-conductor of heat and would greatly retard warming up of refrigerated oysters, aside from its refrigerating effect.

The refrigerant gas from the solid carbon dioxide also chills the cup, 14, and through it, the contents of said cup, whatever it may be.

It will be noted that the plate is not positively secured to the refrigerant supporting tray, the latter being removable for inserting solid carbon dioxide and for cleaning both the plate and the tray.

Under the action of the intense refrigerant, the edges and exposed parts of the plate, 1, become coated with frost, adding a highly pleasing decorative and, so to speak, appetizing effect.

In Fig. 2, there is a slightly different arrangement of the same elements. In this case there is an upper dish or tray element, 21, and a lower tray or support element, 22, but these elements are permanently spun or welded air-tight at the edges, so as to prevent escape of refrigerant gas around the edges through the refrigerating interspace, 27. In lieu of a standard as in Fig. 1, the upstanding central projection, 22, is made large enough to contain the block of frozen carbon dioxide and it is provided with a series of overflow holes, 26, through which the refrigerant gas escapes into the trough-like dish, 21. The frozen carbon dioxide, 8, preferably rests upon an insulating support, 25. The freshly evaporating carbon dioxide gas being intensely cold and heavy, first flows downward into the interspace 27, displacing the air. Being quickly warmed by the relatively cool walls of dish, 21 and tray, 22, it then rises and ultimately is forced out through said holes 26.

In this arrangement, the trough is substantially deeper than in Fig. 1, and is shown as deep enough to contain molded blocks of ice cream, frozen pudding, or the like, as at 28, 29. In this arrangement, the refrigerant gas pours into the trough at a very low temperature, submerging the materials therein and completely preventing melting thereof.

Fig. 2 is intended to illustrate a form in which the cold gas is discharged into the center of the dish instead of over the edges thereof, but it is obvious that vents may be arranged around the edge of the dish as well as in the central projection, 22, if desired.

The removable cup, 30, may be employed as a container of any desired object, whether edible or merely decorative.

In Fig. 3, the plate and tray element is completely eliminated, the utensil being specially designed for purposes analogous to the cups 12, 15, 30 of the preceding figures. As shown, the purpose is support and effective refrigeration of a bottle indicated at 45. In the design shown, the structure is reduced to an external cylinder, 42, supported on a base, 46, having fitted therein a metal cup, 44, which contains the bottle, 45. The block of frozen carbon dioxide, 48, is supported on insulation, 41, and the gas evaporating therefrom is driven up through the interspace between cylinder, 42, and cup, 44. The refrigerant gas escapes through holes, 47, near the top of the cup, maintaining the latter full of intensely refrigerant gas which, becoming warm, ultimately finds its way out, spilling over the edge of the cup. In this case, the frost on the outside of cylinder 42 is particularly in evidence and is particularly pleasing.

This device is particularly useful for refrigeration of ginger ale, making it possible to keep the same near the freezing point without putting in ice, it being well known to lovers of this particular beverage that its strength is undesirably weakened by the melting of the ice and even so, the temperature is seldom as cold as would be desirable.

I claim:

1. A metal dish adapted to be cooled by frozen carbon dioxide comprising a compartment for material to be cooled, a second compartment for holding said frozen carbon dioxide, and means whereby the generated gas from the frozen carbon dioxide in said second compartment overflows into said first compartment, the generated gas being in operative relation to the back surface of the dish, whereby frost is maintained on exposed surfaces of the dish.

2. A container shaped for display of cooled products and formed with inner and outer spaced walls, affording an interspace, the outer wall being of thin highly conducting metal and said container having means whereby solid carbon dioxide may be introduced in position to continuously automatically supply the interspace with intensely cold gas evaporated therefrom.

3. A dish adapted to be cooled by frozen carbon dioxide, comprising a display support portion for the material to be cooled, and a compartment for holding said frozen carbon dioxide, arranged so that the gas generated from the frozen carbon dioxide cools the outer surfaces of the container to a temperature sufficient to insure formation and preservation of frost thereon.

4. A dish adapted to be cooled by frozen carbon dioxide, comprising a display support portion for the material to be cooled, and a compartment for holding said frozen carbon dioxide, arranged so that the gas generated from the frozen carbon dioxide cools said display portion and cools the outer surfaces of the container to a temperature sufficient to insure formation and preservation of frost thereon.

5. A refrigerative for cold products of the kind described, including inner and outer metallic shells spaced to provide an interspace for support of frozen carbon dioxide and for circulation of gas evaporating therefrom, and means for conducting overflow of escaping gas within said inner shell at a high level.

6. A refrigerative service utensil, including a shallow dish, an outer shell, an interspace between the dish and shell providing a storage space for frozen carbon dioxide, and a circulation space for generated carbon dioxide gas, said dish being supported horizontally within said outer shell so that the escaping gas will flow inward from the edges thereof.

7. A dish adapted to be cooled by frozen carbon dioxide comprising a compartment for material to be cooled having an outer wall of heat conducting material, a second compartment for holding said frozen carbon dioxide, and means whereby the generated gas from the frozen carbon dioxide in said second compartment overflows into said first compartment and is retained by gravity in refrigerating relation to the inner surface of said heat conducting outer wall.

8. A refrigerative display device for cold products of the kind described, including means for holding solid carbon dioxide and applying gas therefrom to submerge said products and in proper relation to maintain frost on the exterior of said device, said display device being of gas-tight heat-conducting material but having an open top and from which the gas escapes by high level overflow.

9. The method of displaying cold products for service purposes, consisting in supporting them in a dish-like container having outer walls of good heat conducting material and having an open top, and submerging them in a continuously renewed stagnant pool of intensely cold carbon dioxide gas in heat conducting relation to the outer surface of the container, to cause frost deposit on said outer surface.

10. The method of maintaining frost on an exposed surface of a dish having outer walls of good heat conducting material which includes continuously supplying freshly evaporated carbon dioxide gas to form a pool continuously overflowing at a high level in operative relation to an inner surface of an outer wall of said dish.

Signed at New York city in the county of New York, and State of New York, this 3rd day of November, A. D. 1926.

JAMES W. MARTIN, Jr.